C. P. HASSELGREN.
FLYTRAP.
APPLICATION FILED APR. 27, 1920.

1,358,150.

Patented Nov. 9, 1920.

INVENTOR
Carl P. Hasselgren.
BY Geo. Stevens.
ATTORNEY

UNITED STATES PATENT OFFICE.

CARL P. HASSELGREN, OF SUPERIOR, WISCONSIN.

FLYTRAP.

1,358,150.  Specification of Letters Patent.  Patented Nov. 9, 1920.

Application filed April 27, 1920.  Serial No. 376,928.

*To all whom it may concern:*

Be it known that I, CARL P. HASSELGREN, a citizen of the United States, residing at Superior, in the county of Douglas and State of Wisconsin, have invented certain new and useful Improvements in Flytraps, of which the following is a specification, reference being had therein to the accompanying drawing.

This invention relates to fly traps and has special reference to a device of this character particularly designed for use upon a window frequented by flies and as it is well known that flies invariably walk upwardly upon a window pane, my present invention is particularly designed with the view of taking advantage of such characteristic of the flies.

A further object of the invention is to provide a simple separable trap of this character which may be easily taken apart for cleaning purposes and one that forms the least objectionable appearance in a window.

Referring to the accompanying drawings forming part of this application and in which like reference characters indicate like parts:

Figure 1:
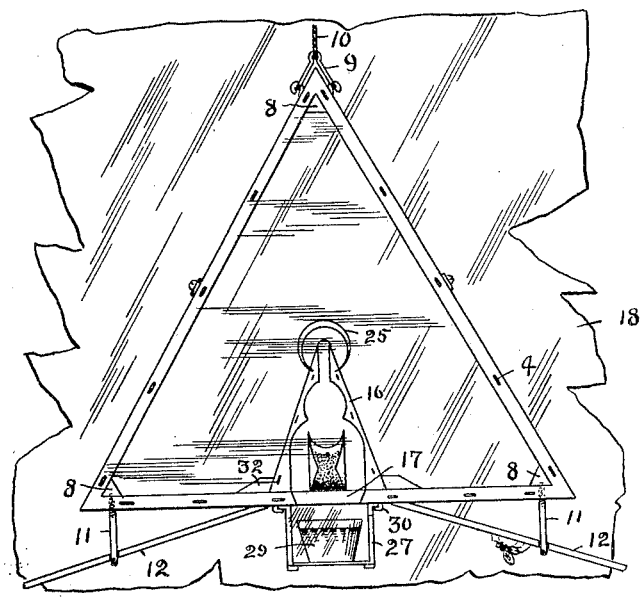
Figure 1 is an elevation of one of my improved traps suspended in a window, the view being taken on the inside of the window where the trap is hung.
Figure 2:
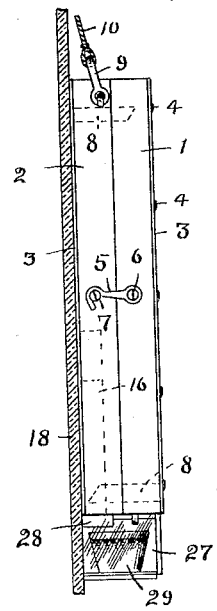
Fig. 2 is a side elevation of Fig. 1 except that the directing wings of the trap are omitted.
Figure 3:
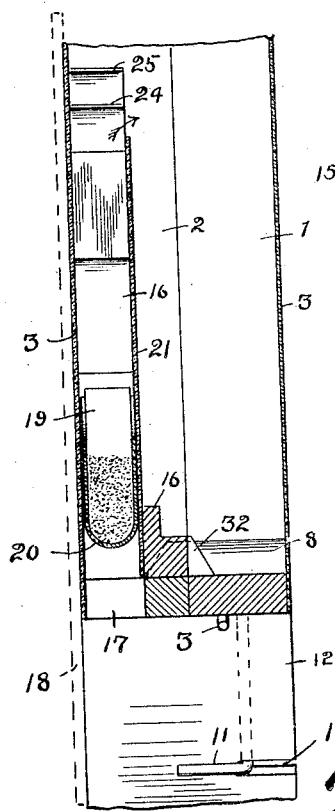
Fig. 3 is an enlarged central vertical sectional view of the lower end of the trap with the water receptacle and housing omitted.

The body of the trap is triangular in shape and is composed of two light separable halves 1 and 2 each comprising a wooden frame structure of three equal sides having mounted across one face thereof a celluloid cover or side 3 which is fastened to the edges of the frame by suitable metal staples 4.

The two halves 1 and 2 are held together by hooks 5 pivoted as at 6 on one half and engageable about suitable pins 7 upon the other half, there being two such hooks one upon either of the uppermost inclined sides of one half. The halves 1 and 2 are made to properly register with each other by suitable dowel pins 8 fastened in the corners of either one or both of the halves as desired, I having shown the uppermost one as secured within the window pane engaging half and the two lower ones secured within the other half, this arrangement, however, being immaterial to the successful operation of the device as is evident.

Figures 4, 5:
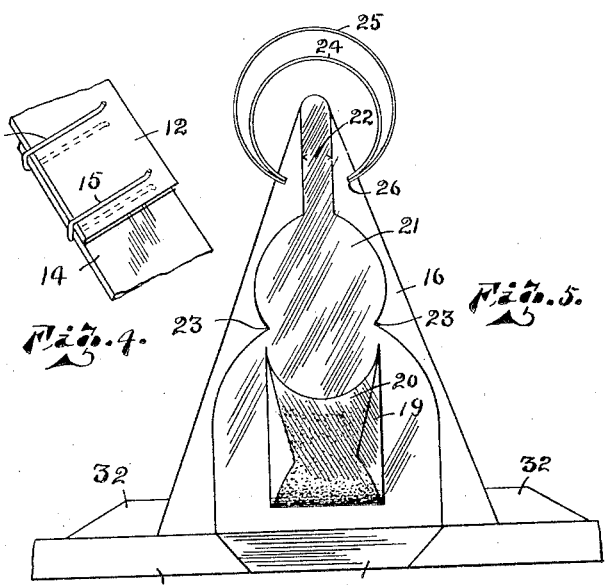
Fig. 4 is a fragmental perspective view of the extension joints in the direction wings.
Fig. 5 is an enlarged front view of the trap entrance and vestibule.

The half 2 has attached to the upper end thereof a suitable bridle 9 which is engaged by the string 10 forming a suitable suspending means for the trap while in the lower wall of the half 1 are two L-shaped screw hooks 11 which suspend the direction wings 12 by engaging a suitable slot 13 properly spaced from the end of said wings to give them the right angle of inclination when in position with the ends adjacent the entrance to the trap. When it is desired to extend these wings, as for instance in a large window, an additional wing 14 may be attached to the extreme lower end of the wing 12 by any desired means such as the clothes-pin-like fastenings indicated at 15 in Fig. 4 of the drawings.

16 represents the vestibule of the trap which is adjustably mounted over the entrance 17 thereof, this entrance being simply an elongated slot in the lower wall of the half 2 of the trap and adjacent the celluloid face 3 thereof so that as a fly walks up the window pane 18 there will be no obstruction to his entering the trap except to walk up onto the celluloid facing and in doing so he enters the vestibule of the trap which is wider at the bottom than at the top, the side walls of which preferably converge arcuately and upwardly over the bait containing receptacle 19 which is securely fixed within the vestibule, it having edge walls of wood like the vestibule and side walls and bottom of celluloid as indicated at 20, the celluloid being wrapped about the wooden pieces and securely glued thereto and the entire bait receptacle being fastened within the vestibule by being glued or otherwise attached to the celluloid facing 21 of the vestibule.

The passageway through the vestibule is contracted above the bait receptacle and terminates in a narrow passageway 22 and I have particularly designed the meeting points of the two lower graduations in the passageway directly over and projecting somewhat inwardly above the bait receptacle as at 23 the purpose being to entice the flies back into the bait receptacle on their way out of the vestibule if they make such an attempt.

Superimposed upon the apex of the vestibule are two circular bands of celluloid 24 and 25, the latter being larger than the former and held in the same slots within the edge walls of the vestibule as indicated at 26 for cheapness and convenience of construction. These are to form a barrier to any fly entering the vestibule on his return down the celluloid face 3 which lies against the window pane 18 when the trap is in place. If peradventure a fly should engage the circle 25 in an attempt to return by the way he came into the trap, he would be further misled in passing around the celluloid band 25 into the space intermediate of the two bands when he would be obliged to make another detour before finding the upper entrance of the vestibule which he would only accomplish by mere chance. The complete vestibule 16 is slidably mounted within the half 2 of the trap intermediate of two inclined holding pieces 32 which are fastened to the bottom of the trap and at any time for cleaning or any other purpose the entire vestibule may be removed from engagement with the trap when the latter is separated.

Below the entrance slot 17 into the bottom of the trap is suspended in any desired manner a rectangularly shaped holder 27 made of celluloid having its upper inner opposed corners cut away as at 28 providing a suitable entrance into the holder 27 for the flies as they travel upwardly on the pane 18 or upon the under sides of the wings 12. In this holder is placed a small glass or celluloid receptacle 29 which contains water for the purpose of enticing the flies, as it is well known that they become exceedingly thirsty when confined in a building and prevented from getting to the open air by the glass in the window and being further subjected to heat in their attempts at getting through the window makes them all the more appreciable of water, and, being readily able to detect odors as well as the presence of humidity itself, it is found that water provides an admirable lure for the flies, and, in addition, the water being located just beneath the receptacle 19 which contains preferably granulated sugar will have a tendency to keep the latter moist and in an especially desirable condition to act as an added lure for the flies.

I have shown the holder as being slidably attached to the under side of the outer half 1 of the trap under suitable depending hooked pieces of wire 30, though, as before stated, this may be accomplished in any desired manner and does not form an essential part of my present invention. In fact various modifications within the scope of the appended claims may be resorted to without departing from the spirit thereof.

What I claim is:

1. A fly trap of the class described comprising a two-part separable triangularly shaped receptacle for engagement against a vertically disposed surface and a removable triangularly shaped combination vestibule and entrance within the receptacle, substantially as described.

2. A fly trap of the character described comprising a triangularly shaped receptacle, a removable triangularly shaped combined entrance and vestibule for flies within the receptacle, a hole through one wall of the receptacle registering with the vestibule and entrance and a bait receptacle within the vestibule.

3. A fly trap of the class described comprising a triangularly shaped receptacle, an entrance hole in one side of the receptacle, a removable triangularly shaped combined vestibule and entrance within the receptacle over said hole, a bait receptacle in the vestibule and a water receptacle suspended below the hole and externally of the receptacle.

4. The combination with a fly trap of the class described in claim 3, of depending supports from either lowermost corner of the receptacle and removable adjustable guiding members within the supports for guiding flies to the entrance, substantially as described.

In testimony whereof I hereunto affix my signature in the presence of two witnesses.

CARL P. HASSELGREN

Witnesses:
  ELLEN THEORIN,
  S. GEO. STEVENS.